(12) United States Patent  (10) Patent No.: US 7,229,356 B2
Iwano  (45) Date of Patent: Jun. 12, 2007

(54) BOOT FOR UNIVERSAL JOINT

(75) Inventor: Kazuhiro Iwano, Tochigi (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/385,040

(22) Filed: Mar. 10, 2003

(65) Prior Publication Data
US 2004/0009820 A1   Jan. 15, 2004

(30) Foreign Application Priority Data
Jul. 9, 2002 (JP) .............................. 2002-199460

(51) Int. Cl.
*F16D 3/84* (2006.01)
(52) U.S. Cl. ....................... 464/17; 464/173
(58) Field of Classification Search ................ 137/50, 137/57; 464/17, 173, 175, 178, 906; 277/634–636, 277/926, 928
See application file for complete search history.

(56) References Cited

U.S. PATENT DOCUMENTS

| 3,688,523 | A | * | 9/1972 | Schafer et al. ............... 464/175 |
| 3,712,080 | A | * | 1/1973 | Shigeura .................. 434/173 X |
| 4,369,979 | A | * | 1/1983 | Krude et al. ................ 464/175 |
| 4,392,838 | A |   | 7/1983 | Welschof et al. |
| 4,559,025 | A | * | 12/1985 | Dore .......................... 464/175 |
| 5,297,996 | A | * | 3/1994 | Draga ........................ 464/175 |
| 5,308,284 | A | * | 5/1994 | Renzo et al. ............... 464/175 |
| 5,582,546 | A | * | 12/1996 | Welschof .................... 464/906 |
| 5,624,318 | A | * | 4/1997 | Jacob et al. ................ 464/906 |
| 5,672,113 | A | * | 9/1997 | Tomogami et al. ......... 464/175 |
| 6,171,196 | B1 | * | 1/2001 | Welschof .................... 464/906 |
| 6,820,876 | B2 | * | 11/2004 | Iwano ........................ 277/635 |

FOREIGN PATENT DOCUMENTS

JP           828704        7/1994

* cited by examiner

*Primary Examiner*—Greg Binda
(74) *Attorney, Agent, or Firm*—Orum & Roth LLC

(57) ABSTRACT

A boot for a universal joint is constructed by a boot body and a boot adapter. The one end of the boot is fitted on a propeller inner shaft via its one-end fitting portion and the other end of the boot is fitted on the outer race of the universal joint via its other-end fitting portion, thereby substantially covering the universal joint. The foregoing one-end fitting portion has an annular lip portion at its end portion. Passages for flowing air between the inside of the boot and the outside of the boot are formed on the one-end fitting portion and the annular lip portion. The passages are closed by the annular lip portion being expanded in diameter outward by a centrifugal force caused by the high rotation of the propeller inner shaft, thereby preventing splashed water or muddy water from intruding into the boot when air is sucked into the boot.

10 Claims, 6 Drawing Sheets

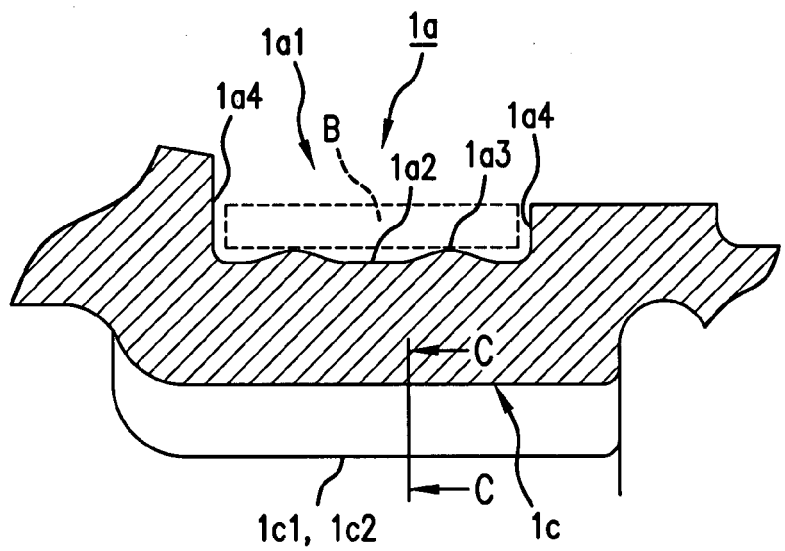
FIG.6
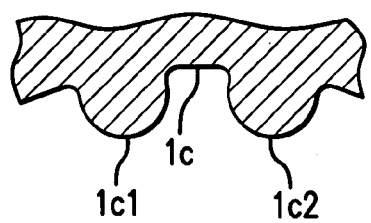
FIG.7
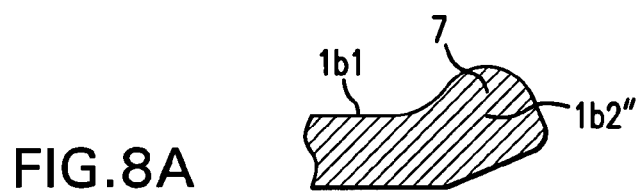
FIG.8A
FIG.8B

BOOT FOR UNIVERSAL JOINT

BACKGROUND OF THE INVENTION

1. Field of the Invention

The present invention relates to a boot for a universal joint and, in particular, to a boot for a universal joint having a sealing structure that properly controls the flow of air or the like between the inside and the outside of the boot in response to a change in the inside volume of the boot based on a pressure fluctuation in the boot. The invention improves sealing performance against the intrusion of splashed water or muddy water.

2. Description of the Related Art

There has been conventionally known a boot for a universal joint having a structure which has a boot body made of an elastic material such as rubber and a boot adapter made of a plate such as a steel plate. One-end fitting portion of the boot body is fitted on the outer peripheral side of an inner shaft such as a propeller shaft or the like and the other-end fitting portion of the boot adapter is fitted on the outer race of the universal joint thereby to prevent dust or muddy water from intruding into the universal joint.

Certain features of a boot for a universal joint are already known from a boot disclosed in Japanese Patent Application Laid-open No 8-28704. The foregoing boot 010, as shown in FIG. 9A, FIG. 9B, FIG. 10A, and FIG. 10B, has a structure for coping with the pressure fluctuation in the boot 010. There, an annular lip portion 01b is in contact with the inner shaft 03 of a propeller shaft or the like outside one-end fitting portion 01a of the boot 010. A passage 01D is present for making the inside of the boot 010 communicate with the outside thereof on the inner peripheral surface of the one-end fitting portion 01a, and a sealing structure is provided with discontinuous protrusions 01c for controlling the passage 01D in response to the pressure fluctuation in the boot 010 in a circumferential direction of the inside of the annular lip portion 01b. The boot 10 controls the inflow or outflow of air or the like caused by the pressure fluctuation in the boot 010 by controlling the passage 01D via the discontinuous protrusions 01c, to reduce a load applied to the boot 010 based on the pressure fluctuation thereby to improve the durability of the boot 010.

In this respect, a part denoted by a reference symbol 0B in the FIG. 9A is a fastening band used for fitting the boot 010.

However, the boot provided with the sealing structure described above does not have sufficient measures against a detrimental effect produced by the pressure fluctuation in the boot. In particular, a pressure fluctuation may occur in the boot, for example, at a time when an abrupt pressure drop is caused in the boot by an abrupt increase in the inside volume of the boot, which is caused by the boot being expanded outward by the action of a centrifugal force produced by the rotation of the boot involved by the rotation of a shaft such as the propeller shaft or the like. In other words, the boot does not have sufficient measures against splashed water or muddy water intruding into the boot through the passage, along with the outside air being sucked into the boot when a negative pressure is produced by an abrupt pressure drop in the boot.

That is, in the sealing structure of the conventional boot 010, as is evident from FIG. 10A and FIG. 10B, when pressure in the boot 010 increases, as shown in FIG. 10A, air or the like in the boot 010 pushes up the lip portion 01b as shown by an arrow p and thus flows out. When the pressure in the boot 010 decreases, as shown in FIG. 10B, the lip portion 01b is strongly pressed on the inner shaft 03 as shown by an arrow q to be bent inward, thereby to bring the discontinuous protrusions 01c formed in the circumferential direction on the inside of the lip portion 01b into contact with the inner shaft 03. In this way, the lip portion 01b is supported by the protrusions 01c, and hence the tip portion of the lip portion 01b is raised up in such a manner to be separated from the inner shaft 03 as shown by an arrow r. This allows the air or the like to be smoothly sucked into the boot 010 through gaps between the discontinuous protrusions 01c, as shown by an arrow s, and hence raises the possibility that splashed water and muddy water will also intrude into the boot along with the suction of the air or the like.

In particular, as described above, when negative pressure is produced by the abrupt pressure drop in the boot 010 caused by the boot 010 being expanded outward by the centrifugal force, a force for pressing the lip portion 01b in a direction shown by the arrow q is increased, to increase a tendency of raising up the tip portion of the lip portion 01b, as shown by the arrow r, thereby expanding a gap between the tip portion of the lip portion 01b and the inner shaft 03. Further, the suction force of the outside air or the like applied to the tip portion, which is produced by the negative pressure abruptly produced in the boot 010, raises the possibility that splashed water or the muddy water will intrude into the boot 010 along with the suction of the air or the like.

The foregoing conventional boot, as described above, does not have a sealing structure which copes sufficiently with the splashed water or the muddy water intruding into the boot along with the suction of the outside air. The intrusion of splashed water or muddy water into the boot causes damage to the boot itself to reduce the durability of the boot. This also deteriorates the lubrication function of grease, which is a material lubricating the inside of the boot, thereby to wear the universal joint in the boot or to form rust over a short time of use, which results in significantly reducing the durability of the universal joint.

Thus, there has been a search for a boot having the sealing structure capable of properly coping with splashed water or muddy water intruding into the boot, but the fact is that there has not been a satisfactory boot developed provided with a sealing structure having a function properly coping with pressure fluctuation in the boot, and a function properly coping with splashed water or muddy water intruding into the boot.

Therefore, it is desired to quickly develop or improve a boot provided with a sealing structure capable of properly coping with the pressure fluctuation in the boot and effectively preventing splashed water or muddy water from intruding into the boot.

SUMMARY OF THE INVENTION

It is an object of the present invention, in a boot for a universal joint, to protect the universal joint and to improve the durability of the boot for the universal joint by properly controlling the flow of air between the inside and the outside of the boot caused by variations in pressure in the boot to prevent splashed water or muddy water from intruding into the boot.

Under the circumstances, the invention provides the boot having a sealing structure capable of suitably coping with the pressure fluctuation in the boot. In particular, the invention relates to measures to remove a detrimental effect produced by a negative pressure generated in the boot by the action of a centrifugal force produced when the boot is rotated. To be more specific, the invention relates to the improvement of a boot that prevents splashed water or muddy water from intruding into the boot when negative pressure is generated in the boot. The invention is a boot for a universal joint for coupling an input-side shaft to an output-side shaft of the type in which one end of the boot is fitted on one shaft of both the shafts via its one-end fitting portion, and the other end of the boot is fitted on the other shaft of both the shafts via its other-end fitting portion, to cover the universal joint. The one-end fitting portion of the boot has an annular lip portion at its end portion. The one-end fitting portion and the annular lip portion each have a partial passage for allowing the inside of the boot to communicate with the outside of the boot. The tip of the annular lip portion of the one-end fitting portion is expanded in diameter outward by centrifugal force generated by the rotation of the annular lip portion thereby closing the passage which allows the inside of the boot to communicate with the outside of the boot when the tip is expanded to a predetermined diameter.

BRIEF DESCRIPTION OF THE DRAWINGS

The present invention will be more fully understood from the detailed description given below and from the accompanying drawings which should not be taken to be a limitation on the invention, but are for explanation and understanding only.

The Drawings:

FIG. 6 is an enlarged view showing the structure of a portion where the boot of the invention is fitted;

FIG. 7 is an enlarged view showing the partial passage structure of a passage for the inflow or outflow of air or the like in the invention and a cross sectional view taken on a line C—C in FIG. 6;

FIG. 8A and FIG. 8B are views showing the structure of a tip of an annular lip portion according to another embodiment of the invention. FIG. 8A is a view showing the tip formed in a thick structural portion, and FIG. 8B is a view showing the tip formed in a structural portion having a weight part buried therein;

FIG. 9A is a sectional side view thereof, and FIG. 9B is a cross sectional view taken on a line 0A—0A in the forgoing FIG. 9A; FIG. 10B is an illustration showing an embodiment where the air or the like flows into the boot.

DESCRIPTION OF THE PREFERRED EMBODIMENTS

Hereafter, the preferred embodiments of the invention will be described based on FIG. 1 to FIG. 8.

Figure 1:
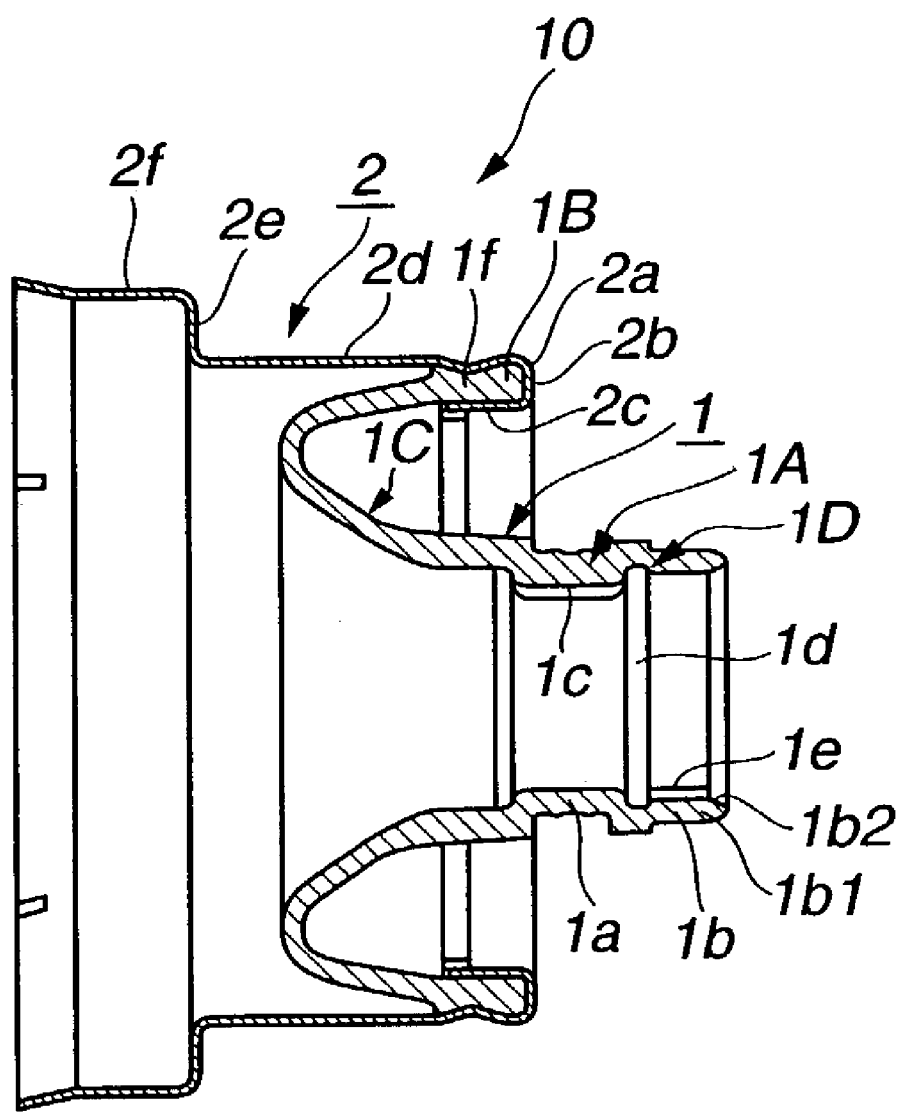
FIG. 1 is a view showing the structure of a boot for a universal joint according to the invention.

FIG. 1 shows a boot 10 for a universal joint of the invention.

The boot 10 for a universal joint includes a boot body 1 made of rubber, a flexible resin, or the like, and a boot adapter 2 formed by properly machining a plate such as a steel plate. The foregoing boot body 1 includes an inner cylindrical portion 1A, an outer cylindrical portion 1B, and a bent portion 1C that is connected to the inner cylindrical portion 1A and the outer cylindrical portion 1B, and which is formed in an annular depressed groove having a cross section formed nearly in a shape of the letter U. The foregoing outer cylindrical portion 1B of the boot body 1 is fixed by one end 2a of the boot adapter 2. The other end of the boot adapter 2 is provided with a fitting portion 2f used for fitting on the outer race of the universal joint, which is one portion of an input-side shaft (not shown).

As shown in FIG. 1, the outer cylindrical portion 1B of the boot body 1 is fixed by the one end 2a of the boot adapter 2 in the following secure manner: an annular end portion 1f which comprises the outer cylindrical portion 1B of the boot body 1 is pinched by the annular end portion 2b and the folded portion 2c of the one end 2a of the adapter 2, such that the folded portion 2c of the boot adapter 2 securely clamped.

Further, the boot adapter 2 comprises a small-diameter cylindrical portion 2d extending a predetermined distance in its axial direction from the one end 2a, which is a portion for fixing the annular end portion 1f of the boot body 1, as a cylindrical portion having the same diameter. A collar portion 2e expands in a radial direction of the other end of the small-diameter cylindrical portion 2d. A fitting portion 2f extends in a cylindrical shape in its axial direction from the collar portion 2e and at which the boot adapter 2 fits on the other structural part, that is, a large-diameter cylindrical portion forming the fitting portion 2f fitting on the outer race of the universal joint not shown in FIG. 1.

The foregoing boot 10 has the structure described above and is fitted in a state shown in FIG. 2 as follows: the one-end fitting portion 1a of the inner cylindrical portion 1A of the boot body 1, which becomes the fitting portion of one end of the boot 10, is fitted on a propeller inner shaft 3. The fitting portion 2f, which is the large-diameter cylindrical portion of the boot adapter 2 and becomes the fitting portion of the other end of the boot 10, is fixedly pressed and fitted on the outer peripheral portion of the outer race 4a of the universal joint 4. The boot 10 is fitted between the propeller inner shaft 3 and the outer race 4a of the universal joint 4 in such a manner as to substantially cover the universal joint 4 by its bent portion 1C of the boot body 1.

Figure 2:
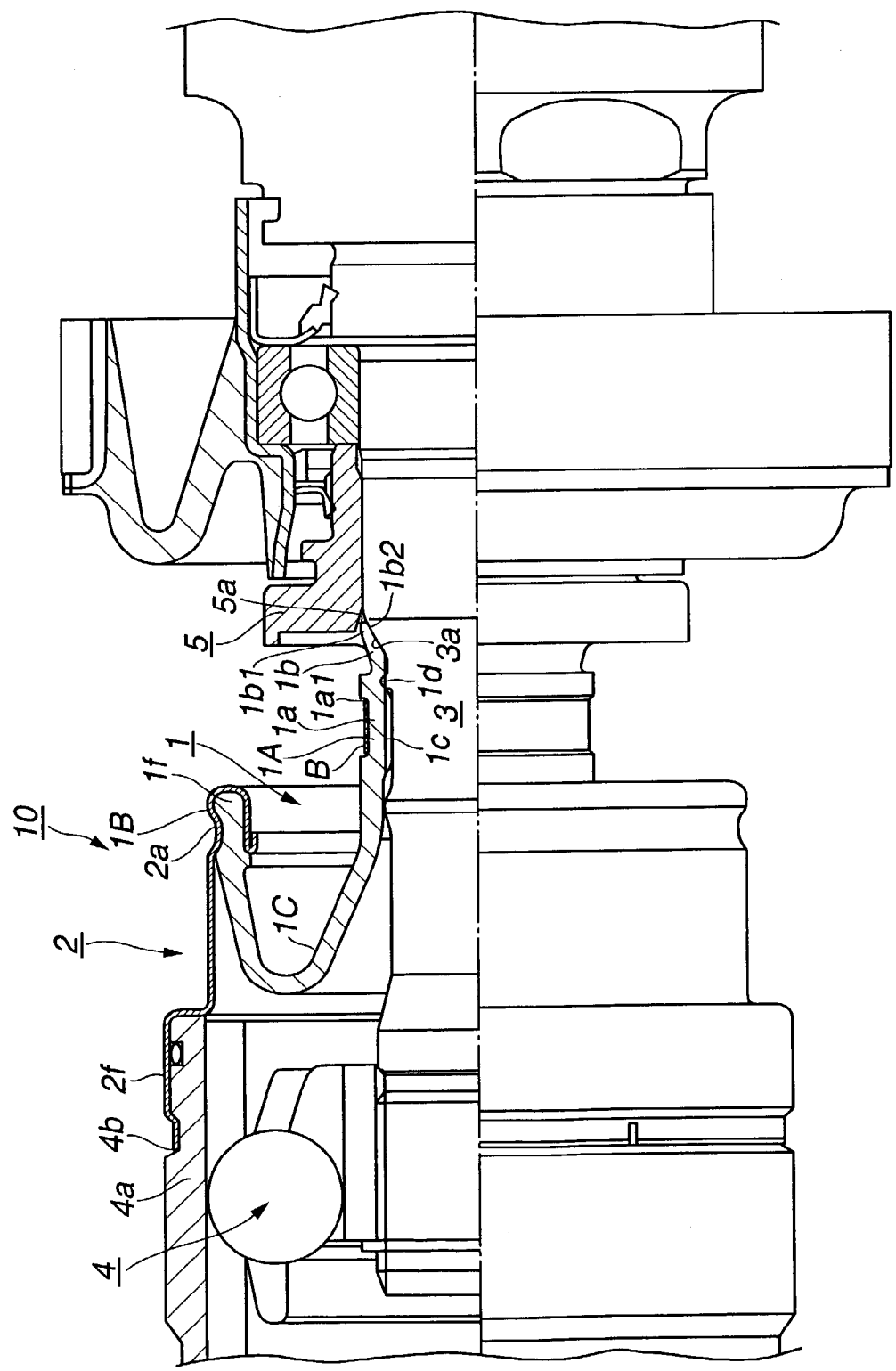
FIG. 2 is a view showing an embodiment where the boot for a universal joint according to the invention is fitted on the propeller shaft of a vehicle.

The foregoing boot body 1, as shown in FIG. 2, is fitted on the propeller inner shaft 3 at the one-end fitting portion 1a by fastening a fastening band B near the end portion of the one-end fitting portion 1a An annular depressed portion 1a1 used for fastening by the fastening band B is formed on the outer peripheral portion of the one-end fitting portion 1a. The bottom surface 1a2 of the annular depressed portion 1a1 is formed to have two annular protrusions 1a3, each of which is formed in a shape of a hill in cross section as shown in FIG. 6. The fastening band B is fitted in the annular depressed portion 1a1 and is fastened in such a relationship that the annular protrusions 1a3, each formed in a shape of a hill in cross section, of the bottom surface 1a2 of the annular depressed portion 1a1 are slightly collapsed. This facilitates adjustment of fastening strength to a suitable value and further prevents the fastening band B from being shifted in a fastening position in the axial direction together with the action of the both side surfaces 1a4 of the annular depressed portion 1a1.

The fitting portion 2f of the other end of the boot adapter 2 is fitted on the outer race 4 as follows: as shown in FIG. 2, the large-diameter cylindrical portion which is the fitting portion 2f of the other end of the boot adapter 2 is pressed on the outer peripheral portion of the outer race 4a of the universal joint 4 from its side portion. The tip portion of the large-diameter cylindrical portion is securely clamped onto the annular depressed portion 4b of the outer peripheral portion of the outer race 4a, whereby the universal joint 4 is nearly completely covered with the boot 10, comprised of the boot body 1 and the boot adapter 2.

Since the boot 10 is fitted in the manner described above, as shown in FIG. 2, the universal joint 4 is nearly completely covered with the boot 10. Thus, the universal joint 4 is nearly completely protected from the intrusion of dust, splashed water, or muddy water from the outside by the boot 10. Further, although grease packed for lubrication is sprayed by the action of a centrifugal force produced when the universal joint 4 is rotated, the boot 10 completely prevents the grease from being sprayed outside.

On the inside peripheral surface of the one-end fitting portion 1a of the one end of the boot body 1a partial passage 1c is formed extending in its axial direction, for passing air or the like. The one-end fitting portion 1a has an annular lip portion 1b extending from its end as shown in FIG. 1. On the inner peripheral surface near a boundary between the one-end fitting portion 1a and the annular lip portion 1b, an annular partial passage 1d is formed extending in a circumferential direction. The annular partial passage 1d communicates with the partial passage 1c formed on the inner peripheral surface of the one-end fitting portion 1a. From the above relationship, both the partial passages 1c and 1d communicate with each other through a passage portion substantially formed in a shape of the letter T.

Figure 5:
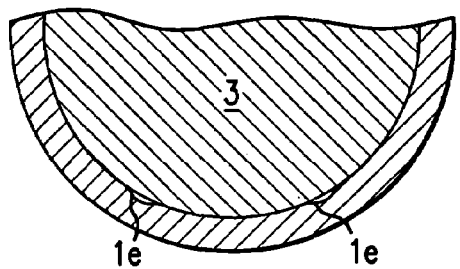
FIG. 5 is a cross sectional view taken on a line B—B in FIG. 3.
Figure 9A:
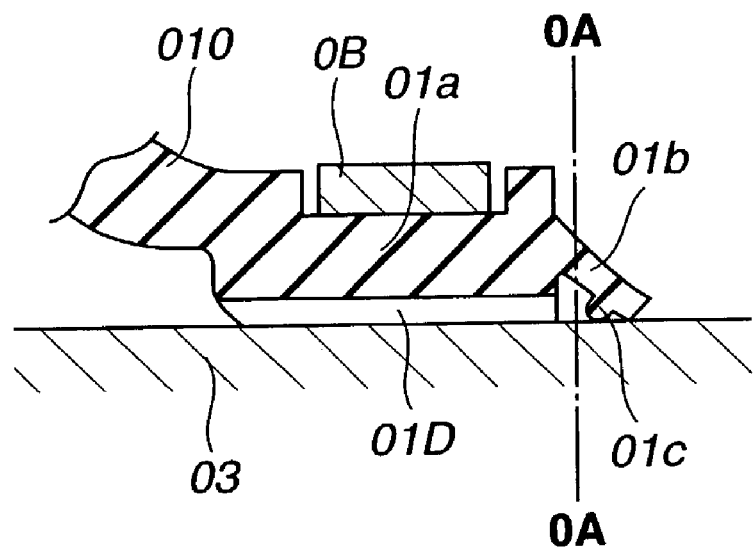
FIG. 9A and FIG. 9B are views showing the structure of a portion where a conventional boot is fitted and its annular portion.
Figure 9B:
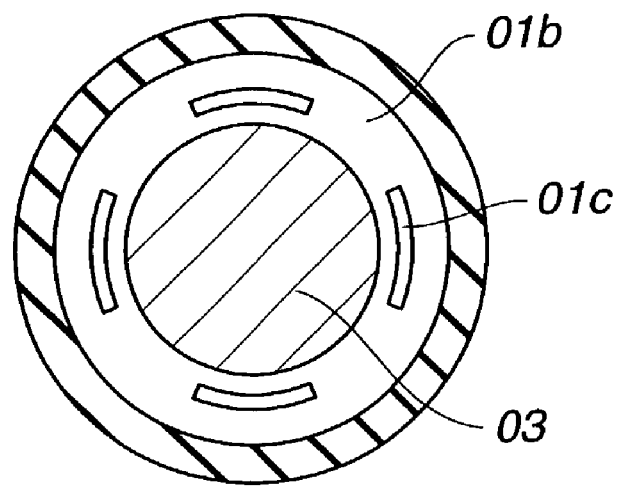
Figure 10A:
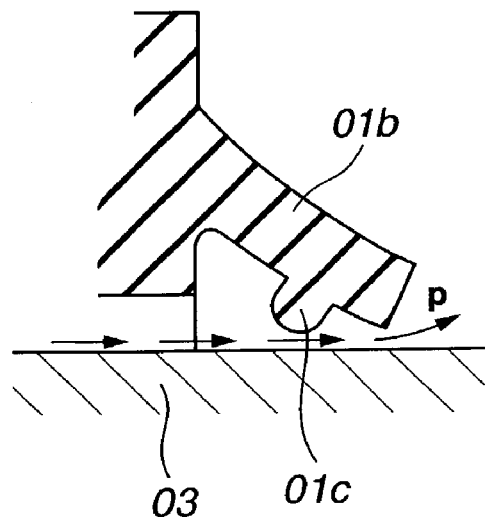
FIG. 10A and FIG. 10B are illustrations showing a state where the conventional annular lip portion controls the inflow and outflow of air or the like, and FIG. 10A is an illustration showing an embodiment where the air or the like flows out of the boot.
Figure 10B:
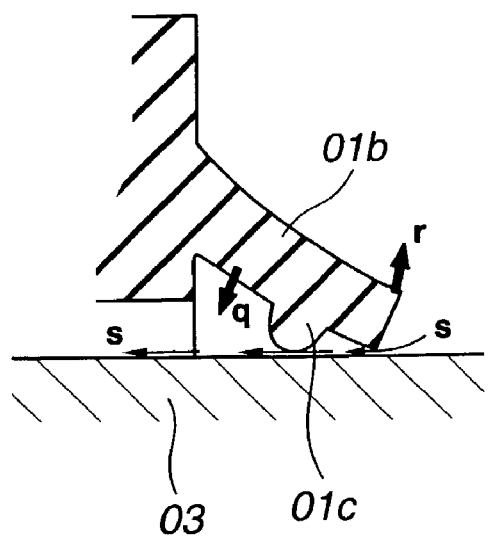

On the inner peripheral surface of the annular lip portion 1b extending from the one-end fitting portion 1a, as shown in FIG. 5, two partial passages 1e is formed along its extending direction. The two partial passages 1e communicate with the annular partial passage 1d formed on the inner peripheral surface of the boundary between the one-end fitting portion 1a and the annular lip portion 1b at predetermined positions in its circumferential direction, respectively. The positions are shifted in phase from the position where the partial passage 1c communicates with the annular partial passage 1d. For example, according to FIG. 4 and FIG. 5, the partial passage 1c is at an upper position in FIG. 4, and the two partial passages 1e are at lower positions in FIG. 5, so that the two partial passages 1e are shifted about 150 degrees to the left and to the right from the partial passage 1c, respectively.

Then, the two partial passages 1e communicate with the annular partial passage 1d via a passage portion substantially formed in a shape of a letter T.

As set out in the above description, the three partial passages 1c, 1d, and 1e (see FIG. 1) are constructed in such a relationship that they communicate with each other. The inside of the boot 10 communicates with the outside of the boot 10 through the three partial passages 1c, 1d, and 1e. The partial passage 1c is formed at the one-end fitting portion 1a and extends in the axial direction, the annular partial passage 1d is formed on the inner peripheral surface of the boundary between the one-end fitting portion 1a and the annular lip portion 1b and extends in the annular direction, and the two partial passages 1e formed on the inner peripheral surface of the annular lip portion 1b extend in the axial direction from the predetermined positions in the circumferential direction of the annular partial passage 1d.

The three partial passages 1c, 1d, and 1e communicate with each other in the manner described above to form one passage 1D. The passage 1D has a passage length elongated by the existence of the annular partial passage 1d and a passage structure having passage portions bent at right angles at a plurality of positions by the existence of the annular partial passage 1d. Thus, the flowing resistance of air or the like flowing through the passage 1D is increased by the passage structure of the passage 1D.

Of the three partial passages 1c, 1d, and 1e, the partial passage 1c formed on the inner peripheral surface of the one-end fitting portion 1a, as shown in FIG. 6 and FIG. 7, is formed as a groove 1c formed between two protrusions 1c1 and 1c2. The partial passages 1e formed on the inner peripheral surface of the annular lip portion 1b and extending in the axial direction and the annular partial passage 1d formed on the inner peripheral surface near the boundary between the one-end fitting portion 1a and the annular lip portion 1b are formed as ordinary concave grooves having no special feature.

Figure 3:
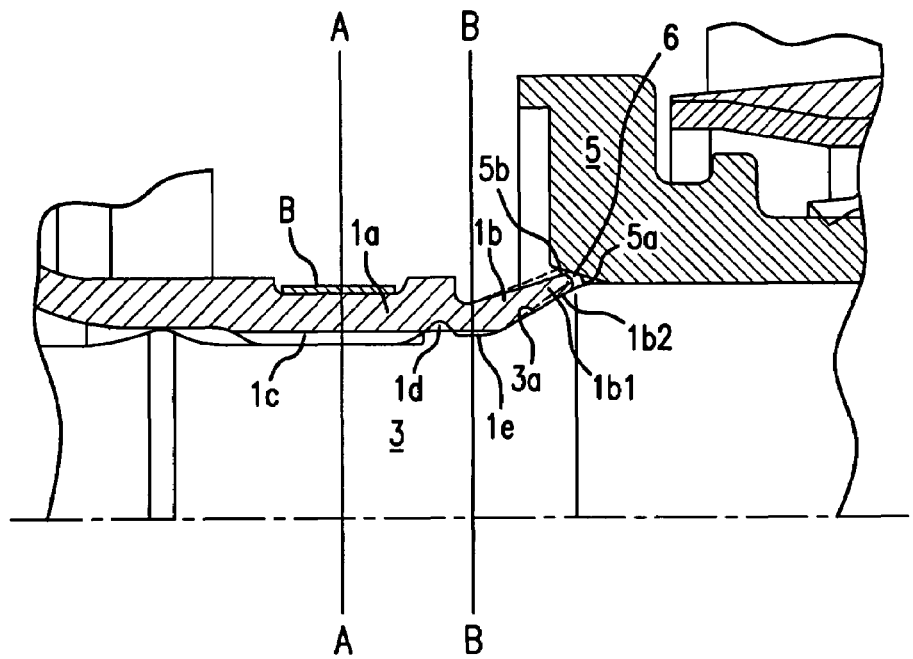
FIG. 3 is a view showing an embodiment where the tip portion of an annular lip portion of the invention is operated by a centrifugal force.
Figure 4:
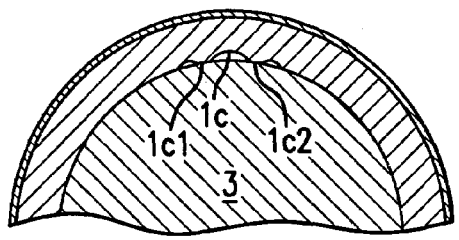
FIG. 4 is a cross sectional view taken on a line A—A in FIG. 3.

The foregoing annular lip portion 1b, as described above, has the annular partial passage 1d formed in the circumferential direction on the inner peripheral surface near the boundary between the one-end fitting portion 1a and itself. The two partial passages 1e formed on its inner peripheral surface and extending in the axial direction and its tip portion 1b1, as shown in FIG. 1 and FIG. 3, is formed as a double-sided annular tapered portion 1b2 the thickness of which becomes thinner toward its tip. When the boot 10 is not fitted, as shown in FIG. 1, the annular lip portion 1b is in a state where it extends nearly in a straight line in the axial direction. When the boot 10 is fitted, as shown in FIG. 2 and FIG. 3, the inner peripheral surface of the annular lip portion 1b abuts against the annular tapered portion 3a of the propeller inner shaft 3 to be elastically expanded in diameter. The tip portion 1b1 of the annular lip portion 1b is held such that the tip portion 1b1 is close to the annular tapered portion 5a of the center bearing holding part 5 of the propeller inner shaft 3

When the propeller inner shaft 3 is rotated, the annular lip portion 1b is elastically expanded in diameter further outward, as shown by a broken line in FIG. 3 by the centrifugal force applied to the annular lip portion 1b. When the centrifugal force exceeds a predetermined value, the tip portion 1b1 of the annular lip portion 1b is brought into press contact with the annular tapered portion 5a of the center bearing holding part 5 as shown by a broken line In FIG. 3.

Then, the tip portion 1b1 of the annular lip portion 1b being brought into press contact with the annular tapered portion 5a of the center bearing holding part 5 by the expansion in diameter of the tip portion b1 acts to substantially interrupt or limit the flow of the air or the like between the inside of the boot 10 and the outside of the boot 10 through the passage 1D, as will be described later.

Since the boot 10 of the invention has the structure described above, it operates in the following manner.

When a vehicle runs normally or at low speeds, the propeller inner shaft 3 is moderately rotated, so that the pressure in the boot 10 is kept in an ordinary condition. In this state, the inside of the boot 10 is brought into communication with the outside of the boot 10 through the passage 1D, including the three partial passages 1c, 1d, and 1e. That is, the partial passage 1c which is formed on the inner peripheral surface of the one-end fitting portion 1a of the boot 10, the annular partial passage 1d which is formed on the inner peripheral surface near the boundary between the one-end fitting portion 1a of the boot and the annular lip portion 1b, and the two partial passages 1e formed on the inner peripheral surface of the annular lip portion 1b. Air or the like hardly flows through the passage 1D between the inside and the outside of the boot 10.

Thereafter the propeller shaft 3 may be moderately rotated, so that the tip 1b1 of the annular lip portion 1b is hardly expanded in diameter by the centrifugal force. Hence, the tip 1b1 of the annular lip portion 1b is held without being put into contact with the tapered surface 5a of the center bearing holding part 5, thereby preventing the opening 6 of the passage 1D for sucking air or the like from being closed.

When the pressure in the boot 10 is increased, that is, when the pressure in the boot 10 is increased by a temperature increase in the boot 10 caused by frictional heat generated when the vehicle runs for a long time, or when the pressure in the boot 10 is increased by variations in the inside volume of the boot 10 due to the boot 10 being slid inward by the operation of the universal joint 4, or by the deformation of the boot 10, air or the like in the boot 10 is discharged outside through the passage 1D to prevent the pressure in the boot 10 from being increased.

Further, when the pressure in the boot 10 is decreased, for example, when a negative pressure is generated in the boot 10 by variations in the inside volume of the boot 10 that are caused by the boot 10 being slid outward by the operation of the universal joint 4 or by the deformation of the boot 10, the boot 10 is contracted, and sometimes there is a risk that the boot 10 is brought into direct contact with the universal joint 4. However, when the negative pressure is generated in the boot 10 in this manner, air (outside air) is sucked into the boot 10 from the outside of the boot 10 through the passage 1D to restore the boot 10 by its elasticity, so that the boot 10 is prevented from being brought into contact with the universal joint 4.

Since the negative pressure generated in the boot 10 in the state described in the foregoing paragraph is usually comparatively slight and, taking into account an increase in the flowing resistance of air or the like produced by the long passage length of the passage 1D, and the passage structure of the passage 1D having passage portions bent at right angles in the passage 1D, a force for sucking the air and the like (outside air) into the boot 10 from the outside is reduced. This results in an extremely small possibility that splashed water or muddy water is sucked into the boot 10 along with air or the like , when air or the like is sucked into the boot.

When the vehicle runs as high speeds, the rotational speed of the propeller inner shaft 3 is abruptly increased, and hence the boot 10 is expanded outward by the centrifugal force produced by the high rotational speed. This abruptly expands the inside volume of the boot 10 to quickly decrease the pressure in the boot 10, thereby abruptly increasing the negative pressure. This increases a force for the boot 10 to suck air or the like from the outside, thereby making splashed water or muddy water intrude into the boot 10 when outside air or the like is sucked into the boot 10. In the invention, however, when the boot 10 is abruptly expanded by centrifugal force, at the same time, the centrifugal force is applied also to the annular lip portion 1b of the boot 10, as shown in FIG. 3. Thus, the tip 1b2 of the annular lip portion 1b is elastically expanded in diameter outward by the centrifugal force, and the expanded tip 1b1 is pressed on the annular tapered portion 5a of the center bearing holding part 5, as shown by a broken line in FIG. 3, dosing the opening 6 at the pressed portion 5b through which air is sucked into the boot 10. This prevents or limits the flow of air or the like into the boot 10 through the passage 1D.

Since the embodiment shown in FIG. 1 to FIG. 8B is constructed in the manner described above, when the boot 10 is expanded to abruptly increase its inside volume by the centrifugal force generated when the vehicle runs at high speeds, and the propeller inner shaft 3 is rotated at high rotational speeds, the pressure in the boot is abruptly brought into a negative pressure condition. At the same time, the tip 1b1 of the annular lip portion 1b of the boot 10 is expanded in diameter outward by the centrifugal force, and is pressed on the annular tapered portion 5a of the center bearing holding part 5, thereby closing or nearly dosing the opening 6 at the pressed portion 5b through which air or the like is sucked. In this manner, a combination of the above effect and the effect of increasing the flowing resistance of air or the like by the passage structure of the passage 1D can nearly completely prevent splashed water or muddy water from intruding into the boot 10 when outside air or the like is sucked into the boot 10.

Various embodiments other than the specifically described embodiment are encompassed by this inventive concept.

In one embodiment, the tip 1b1 of the annular lip portion 1b is formed in a shape such that the thickness becomes thinner toward the tip 1b1 (double-sided tapered shape). In order to increase its centrifugal force in palace of this double-sided tapered tip 1b1, as shown in FIG. 8A and FIG. 8B, it is also recommended that the tip 1b1 has a thick structural tip portion 1b2 or has a part W to accommodate a weight inserted therein. In this case, the material of the weight part is not limited to metal but can be suitably selected.

The shapes of the annular lip portion 1b and its tip 1b1 are suitably modified in response to the structural modification, to increase the centrifugal force of tip 1b1 of the annular lip portion 1b. The shapes of the annular lip portion 1b and its tip 1b1 can be suitably selected and set without deviating from the scope and spirit of the invention, and within a range producing the intended effect of the invention, which includes the shape shown in one embodiment.

In one embodiment, the portion on which the tip 1b1 of the annular lip portion 1b is pressed by the centrifugal force is the tapered portion 5a of the center bearing holding part 5. The portion is not limited to this, but can be suitably replaced with another part mounted on the propeller inner shaft 3.

In one embodiment, there is provided two partial passages 1e formed on the inner peripheral surface of the annular lip portion 1b of the boot 10 and in communication with the annular partial passage 1d formed on the inner peripheral surface near the boundary between the one-end fitting portion 1a and the annular lip portion 1b. The number of the partial passages 1e can be suitably selected, for example, they can be one, three, four, or the like.

In one embodiment, positions where the two partial passages 1e formed on the inner peripheral surface of the annular lip portion 1b communicate with the annular partial passage 1d are shifted in phase about 150 degrees to the left and to the right, respectively, from the position where the passage 1c formed on the inner peripheral surface of the one-end fitting portion 1a communicates with the annular partial passage 1d. The positions where the two partial passages 1e communicate with the annular partial passage 1d can be suitably selected. Further, even if the number of the partial passages 1e is suitably selected, the communication positions of the partial passages 1e can be suitably selected.

As described above with respect to FIGS. 1–8B, according to the invention, In a boot 10 for a universal joint 4 for coupling an input-side shaft to an output-side shaft of the type in which one end of the boot 10 is fitted on one shaft of both the shafts via its one-end fitting portion 1a and the other end of the boot 10 is fitted on the other shaft of both the shafts via its other-end fitting portion thereby to cover the universal joint, the one-end fitting portion 1a of the boot 10 has an annular lip portion at its end portion. The one-end fitting portion 1a and its annular lip portion 1b each have a partial passage 1c for allowing the inside of the boot 10 to communicate with the outside of the boot 10. The tip 1b2 of the annular lip portion of the one-end fitting portion is expanded in diameter outward by its centrifugal force generated by the rotation of the annular lip portion 1b, thereby closing the passage 6 for allowing the inside or the boot to communicate with the outside of the boot, where the tip 1b2 is expanded to a predetermined diameter. Thus, the boot 10 is expanded by the centrifugal force generated by the high speed rotation of the propeller inner shaft 3 when the vehicle runs at high speeds, thereby nearly completely preventing splashed water or muddy water from intruding into the boot 10 through the passage when negative pressure is produced by the abrupt expansion of the inside volume of the boot 10. This can prevent the boot 10 from being damaged by the intrusion of muddy water and can improve the durability of the boot 10. Further, this can prevent deterioration of the lubrication function of grease contained in the boot 10, which prevents rust or wear from being produced on the universal joint, hence improving the durability of the universal joint.

Further, according to the invention, the diameter of the tip of the annular lip portion 1b1 of the one-end fitting portion is expanded by the centrifugal force produced by the thick portion of the tip 7 of the annular lip portion 1b. Thus, in addition to the effect, by means of a simple structure, it is possible to increase the function of expanding the diameter of the tip 1b2 of the annular lip portion 1b1 by centrifugal force, and to improve the function of closing the passage 6, hence increasing the effect of preventing the intrusion of splashed water or muddy water.

Still further, according to the invention, the diameter of the tip 1b2' of the annular lip portion 1b1' of the one-end fitting portion is expanded by the centrifugal force produced by a weight W part in the tip 1b2' of the annular lip portion. Thus, in addition, by means of a simple structure, it is possible to increase the function of expanding the diameter of the tip 1b2' of the annular lip 1b1' portion by the centrifugal force, and to improve the function of closing the passage 6 thereby increasing the effect of preventing the intrusion of splashed water or muddy water.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A boot for a universal joint for coupling an input-side shaft to an output-side shaft of the type in which one end of the boot is fitted on one shaft of both the shafts via a one-end fitting portion of the boot and the other end of the boot is fitted on the other shaft of both the shafts via an other-end fitting portion of the boot to cover the universal joint comprising:

one-end fitting portion of the boot contiguous with an annular lip portion extending from an end portion, in a shape which facilitates outward expansion of the annular lip portion under centrifugal forces, the one-end fitting portion and the annular lip portion each having a partial passage for allowing an inside region of the boot to communicate with an outside region of the boot, a tip of the annular lip portion being expanded in diameter outward by centrifugal force generated by rotation of the annular lip portion, wherein the partial passages for allowing the inside of the boot to communicate with the outside of the boot are closed when the tip is expanded outward to a predetermined diameter to seal against a surface.

2. A boot for a universal joint according to claim 1, wherein
   a diameter of the tip of the annular lip portion is expanded by a centrifugal force, produced by an annular thick portion of the tip of the annular lip portion.

3. A boot for a universal joint according to claim 1, wherein
   a diameter of the tip of the annular lip portion is expanded by a centrifugal force, produced by a weight part in the tip of the annular lip portion.

4. A boot for a universal joint according to claim 1, wherein the boot is connected to a universal joint having a center bearing,
   an annular tapered portion formed on an inner surface of the center bearing holding part of a propeller inner shaft, the tip of the annular lip portion being adjacent to the annular tapered portion, and
   the partial passages for allowing the inside of the boot to communicate with the outside of the boot are closed by the annular lip portion which is in a shape which facilitates outward expansion of the annular lip portion under centrifugal forces and which is expanded in diameter outward by the centrifugal force being pressed on the annular tapered portion.

5. A boot for a universal joint according to claim 1, wherein the tip of the annular lip portion is formed in a double-sided tapered portion that becomes thinner towards its tip.

6. A boot for a universal joint for coupling an input-side shaft to an output-side shaft of the type in which one end of the boot is fitted on one shaft of both the shafts via a one-end fitting portion of the boot and the other end of the boot is fitted on the other shaft of both the shafts via an other-end fitting portion of the boot to cover the universal joint comprising:

one-end fitting portion of the boot contiguous with an annular lip portion extending from an end portion in a shape which facilitates outward expansion of the annular lip portion under centrifugal forces, the one-end fitting portion and the annular lip portion each having a partial passage for allowing an inside region of the boot to communicate with an outside region of the boot, a tip of the annular lip portion being expanded in diameter outward by centrifugal force generated by rotation of the annular lip portion, wherein the partial passages for allowing the inside of the boot to communicate with the outside of the boot are closed when the tip is expanded outward to a predetermined diameter to seal against a surface, wherein a diameter of the tip of the annular lip portion is expanded by a centrifugal force, produced by a weight part in the tip of the annular lip portion, and wherein the weight part is made of a different material than the tip.

7. A boot for a universal joint according to claim 6 wherein the weight part is made of metal.

8. A boot for a universal joint for coupling an input-side shaft to an output-side shaft of the type in which one end of the boot is fitted on one shaft of both the shafts via a one-end fitting portion of the boot and the other end of the boot is fitted on the other shaft of both the shafts via an other-end fitting portion of the boot to cover the universal joint comprising:

one-end fitting portion of the boot contiguous with an annular lip portion extending from an end portion in a shape which facilitates outward expansion of the annular lip portion under centrifugal forces, the one-end fitting portion and the annular lip portion each having a partial passage for allowing an inside region of the boot to communicate with an outside region of the boot, a tip of the annular lip portion being expanded in diameter outward by centrifugal force generated by rotation of the annular lip portion, wherein the partial passages for allowing the inside of the boot to communicate with the outside of the boot are closed when the tip is expanded outward to a predetermined diameter to seal against a surface, wherein a diameter of the tip of the annular lip portion is expanded by a centrifugal force, produced by a weight part in the tip of the annular lip portion, and wherein the weight part is inserted into the tip.

9. A boot for a universal joint according to claim 8, wherein the weight part is made of a different material than the tip.

10. A boot for a universal joint according to claim 8, wherein the weight part is made of metal.

* * * * *